United States Patent [19]

Strigl

[11] 4,399,659

[45] Aug. 23, 1983

[54] VAPORIZATION OF SMALL AMOUNTS OF LIQUEFIED GASES

[75] Inventor: Reinhard Strigl, Munich, Fed. Rep. of Germany

[73] Assignee: Linde Aktiengesellschaft, Wiesbaden, Fed. Rep. of Germany

[21] Appl. No.: 296,665

[22] Filed: Aug. 27, 1981

[30] Foreign Application Priority Data

Aug. 30, 1980 [DE] Fed. Rep. of Germany ....... 3032822

[51] Int. Cl.³ .............................................. F17C 7/02
[52] U.S. Cl. ............................................ 62/52; 62/11
[58] Field of Search ...................................... 62/52, 11

[56] References Cited

U.S. PATENT DOCUMENTS

| | | | |
|---|---|---|---|
| 2,975,604 | 3/1961 | McMahon | 62/52 |
| 3,018,632 | 1/1962 | Keith | 62/52 |
| 3,034,309 | 5/1962 | Muck | 62/52 |
| 3,347,055 | 10/1967 | Blanchard et al. | 62/52 |

*Primary Examiner*—Ronald C. Capossela
*Attorney, Agent, or Firm*—Millen & White

[57] ABSTRACT

In a process for the vaporization of liquefied gases, e.g., oxygen, argon, nitrogen, in a sufficiently small quantity to have been vaporized heretofore without use of the cold content therein, the improvement of vaporizing said liquefied gas in indirect heat exchange with a gaseous medium being a process gas, e.g., hydrogen, or fuel gas, e.g., natural gas, and using the resultant cooled gaseous medium for industrial or domestic purposes in either the gaseous or liquid form, e.g., reaction gas, inert environment, heating. The gaseous medium may be fractionally condensed simultaneously to remove impurities therefrom, e.g., moisture from technical grade hydrogen, or a heavy fraction from natural gas.

20 Claims, 1 Drawing Figure

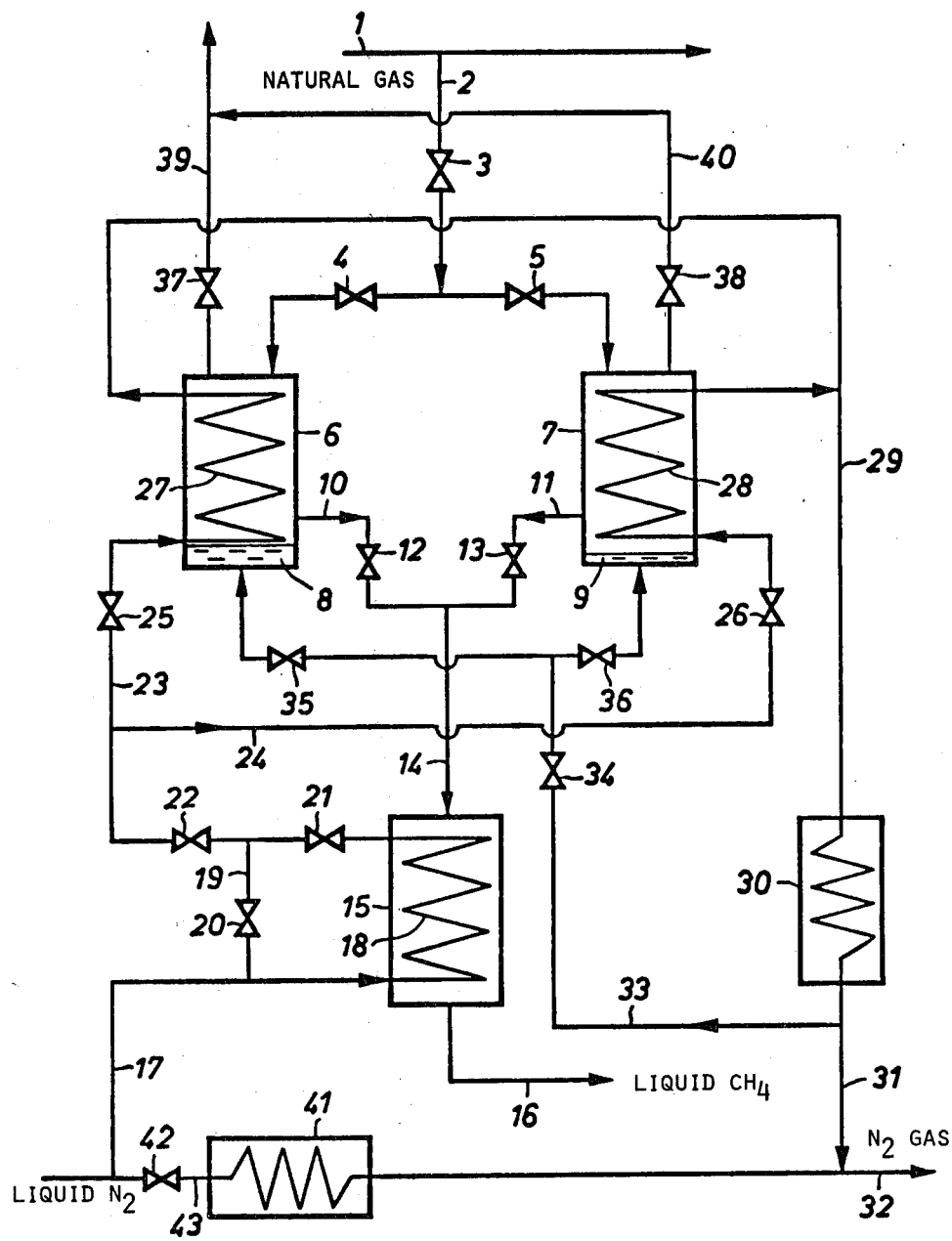

VAPORIZATION OF SMALL AMOUNTS OF LIQUEFIED GASES

BACKGROUND OF THE INVENTION

This invention relates to a process and apparatus for the vaporization of relatively small amounts of liquefied, low-boiling gases.

A number of low-boiling gases, for example oxygen, nitrogen, argon, or natural gas are frequently handled in the liquid phase in order to obviate or at least mitigate the problems connected with transportation or storage of these gases in the gaseous phase. The great reduction in volume resulting from liquefaction has led, for example, in the absence of pipeline systems, to the extensive practice of transporting natural gas in the liquid form from its source to consumption sites. Natural gas is also liquefied for storage purposes, i.e. gas is withdrawn from a natural gas network during times of low demand and stored to cover peak demands, the gas being liquefied in so-called peak-shaving plants and, when required, revaporized and fed back into the natural gas network. Finally, oxygen, nitrogen, argon, or other gases required in a plurality of applications are frequently obtained in the liquid phase and transported to their consumption sites in the liquid phase and are there revaporized.

In all such cases, considerable energy is required both for liquefying the gases and for their subsequent revaporization. Nevertheless, since the economic advantages attainable by the use of liquid phase transportation or storage more than offset this energy expenditure, the aforesaid liquefaction processes are widely employed.

During the revaporization of the liquefied gases at the consumption site, a large percentage of the energy expended during liquefaction can theoretically be recovered. Therefore, several proposed processes have been made to recover the refrigeration value of liquid natural gas, the latter being commonly transported to consumer sites, unloaded in liquefied natural gas terminals, and after vaporization, introduced into a distribution network. ("Refrigeration value" is interchangeably called refrigeration or cold content, or just cold.) Such processes relate, for example, to coupling with an ethylene plant (French Pat. No. 1,458,194), with air fractionation plants, or with refrigeration plants (Hydrocarbon Processing, November 1974, page 97). In all heretofore proposed processes, liquefied natural gas is vaporized continuously and in very large quantities so that the refrigeration values produced during vaporization can also be transferred continuously and with great reliability to a refrigeration consumer, which, in turn, is a prerequisite for the successful operation of such plants.

In contrast thereto, if only a comparatively minor amount, e.g., less than about 1000 Nm$^3$ per hour, of a liquefied gas were vaporized, or vaporization did not take place continuously, the refrigeration values were not utilized heretofore because the installation of a plant suitable for using such cold would not be economic; rather, vaporization merely took place in heat exchangers heated by air, water, or other heat-transfer agents without use of the cold content.

SUMMARY OF THE INVENTION

It is, therefore, an object of this invention to provide a process and apparatus for the economic recovery of refrigeration content of liquefied gases where the vaporization quantities of liquefied gases are small as compared to the amounts of natural gas to be vaporized in liquefied natural gas terminals.

Upon further study of the specification and appended claims, further objects and advantages of this invention will become apparent to those skilled in the art.

To attain these objects, there is provided a process and apparatus involving the vaporization of liquefied gas in indirect heat exchange with a process or fuel gas which is used for industrial or domestic purposes in either the gaseous or liquid form.

In the context of this invention, the liquefied gases to be vaporized have normal boiling points of less than 100° K., preferably less than 95° K.

The process of this invention is especially suitable for use in cases where oxygen, nitrogen, or argon, to be employed, for example, as a reaction gas or to provide an inert environment, is to be vaporized, and is required in the gaseous state in quantities not more than, for instance 1000 Nm$^3$, preferably not more than 500 Nm$^3$ of gas per hour.

Typical but not limitative for the process of the invention is the evaporation of inert gases like nitrogen or argon which are widely used as protective gases in the chemical or engineering industry. For example, these gases can be used as protective gases in large scale tanks or in many processes wherein heat is applied, e.g., in metallurgical works.

Such gas quantities are obtained, for example, in refilling plants for technical gases wherein liquefied gases are vaporized and dispensed into bottles for small-scale consumers, or in operations which, although requiring somewhat larger amounts of these gases, do not find it economical to provide an air fractionation or other gas producing plant for their own production of oxygen, nitrogen or argon and therefore cover their demand by evaporating the respective liquid gases.

Plants utilizing these industrial gases are frequently concentrated near natural gas lines. Thus natural gas is a highly suitable medium for vaporization purposes, the natural gas being in turn liquefied. If the cold contained in the liquid oxygen, nitrogen, or argon is used for natural gas liquefaction in a countercurrent heat exchanger, it is possible to liquefy 1 Nm$^3$ of natural gas by evaporating either 2.3 Nm$^3$ of nitrogen or about 2 Nm$^3$ of argon or 1.9 Nm$^3$ of oxygen, thereby taking into account an unusable temperature gradient of about 10° C. in the heat exchangers. The resultant liquefied natural gas can then be used, for example, within a production plant for the operation of plant vehicles, can be stored as a peak-shaving gas, or can be sold.

Correspondingly, the cold contained in the vaporizing liquefied gases can, of course, also be utilized in the liquefaction of other gases.

Another embodiment of the process of this invention provides that the refrigeration content is employed for purification of a gas. The gas to be purified is cooled in heat exchange against evaporating liquid gas, and during this step, higher-boiling components are condensed and are separated in the liquid phase from the remaining gas. The process is therefore suitable for separating either higher-boiling components from a low-boiling gas, or for the separation of low-boiling components from a higher-boiling gas.

As an example of gas purification, the process can be utilized for the purification of hydrogen. In the heat treatment of high-alloy steels, highly pure hydrogen is desirable as the shielding gas. However, for economical reasons, only technically pure hydrogen is utilized in most cases, this hydrogen still containing minor quantities of oxygen and water vapor. If such a technically pure hydrogen stream, the dew point of which is ordinarily about $-35°$ C., is cooled against evaporating liquefied gas, then at the very least, the deleterious moisture content can be significantly reduced. In this connection, it is advantageous to cool the hydrogen to a dew point of below $-70°$ C.

In the liquefaction of natural gas or other gases consisting of several components, a condensate of heavier components is first obtained (just as in the latter case of purifying a gaseous stream) during the course of cooling against evaporating liquid gas. Since these heavier components are frequently undesirable in the liquefied natural gas or in other liquefied gases, in a further embodiment of the process of this invention, such heavy components are condensed in a first heat exchange stage and are separated from the cooling-down, gaseous medium. The thus-separated condensates are then advantageously revaporized and purged by direct heat exchange with a suitable gaseous stream, which forms a gaseous mixture therewith.

Apparatus for conducting the process comprises at least one heat exchanger for the indirect heat exchange between the liquid gas to be vaporized and the gaseous medium. An especially advantageous apparatus utilizes at least a dual design, at least in part, wherein the heat exchangers are connected in parallel to each other and are respectively in communication with a condensate separator. The condensate separator can in this system be coupled directly with the flow cross section of th heat exchangers for the medium to be cooled, for example by arranging the separator in a different zone of this flow cross section.

BRIEF DESCRIPTION OF THE DRAWING

The attached FIGURE is a schematic representation of a preferred embodiment of the invention.

DETAILED DESCRIPTION OF DRAWING

The preferred illustrated embodiment involves a small-scale (about 100 Nm$^3$/h of gas liquefied) liquefier for the liquefaction of natural gas by heat exchange with evaporating liquid nitrogen. The natural gas is withdrawn from a conduit 1 and fed to the liquefier via conduit 2. Since the natural gas fed from conduit 1 is in most cases under a high pressure, it is first expanded in valve 3 to a pressure of about 2 bar and then passes via magnetically controlled valve 4, 5 into one of the two parallel-operated heat exchangers 6 and 7, respectively. In these alternatingly operated heat exchangers, the natural gas is cooled to a temperature of about $-90°$ C. to $-100°$ C., whereby the higher-boiling components are mostly condensed and accumulate in the lower zones 8, 9 of heat exchangers 6, 7, respectively. The thus prepurified natural gas, now containing almost exclusively of methane, is withdrawn from the heat exchanger 6 or 7 via conduit 10 or 11 and, after flowing through valve 12 or 13, is introduced via conduit 14 into heat exchanger 15. In this heat exchanger, a further cooling step is conducted to a temperature of between about $-165°$ C. and $-180°$ C., wherein the natural gas is entirely liquefied and is then conducted via conduit 16 to a storage tank, not shown.

The refrigeration required for liquefying the natural gas is made available by evaporating nitrogen. For this purpose, liquid nitrogen is fed at a rate of 230 Nm$^3$ per hour from a storage tank, not shown, via conduit 17 to the heat exchanger 15 and vaporized in the flow cross section 18 thereof. The cooling of heat exchanger 15 can be regulated by a bypass line 19 and valves 20, 21. The partially warmed nitrogen is then conducted, after passing through valve 22, via one of conduits 23 or 24 to the heat exchanger 6 or 7 charged at that time with natural gas. After flowing through the control valve 25 or 26, further warming is effected against cooling natural gas in the flow cross sections 27 and 28 respectively. The warmed nitrogen thereafter passes via conduit 29 to a heat exchanger 30 designed as a secondary heater, wherein, if necessary, a secondary warming step is conducted. Subsequently, the thus-warmed gaseous nitrogen stream is fed via conduits 31 and 32 to the utilization sites.

The components removed from the natural gas by condensation in heat exchanger 6 or 7 consist essentially of ethane, propane, butane, pentane, hexane, and carbon dioxide. These components are respectively revaporized between two operating phases of the heat exchangers by a small partial stream of the evaporated nitrogen which is branched off via conduit 33 and, after passing through control vale 34 and valve 35 or 36, is fed to the heat exchanger 6 or 7 not in operation at that time. The components, revaporized by direct heat exchange with the warm nitrogen, are then withdrawn via the conduits 39 and 40, respectively, equipped with valves 37, 38, and be utilized, for example, as heating gas.

In one embodiment of the aforedescribed arrangement, the feature of feeding the nitrogen used for purging through conduit 33 can be eliminated. Instead, the components condensed in heat exchanger 6 or 7 are driven out by heat exchange with combustion products of precisely these components.

Via the conduit 43, provided with control valve 42, a partial stream of the liquid nitrogen can be introduced into heat exchanger 41 to be vaporized therein in the usual way against air or another heat-transfer medium.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

I claim:

1. A process for the vaporization of a liquefied gas having a normal boiling point below 100° K., in a sufficiently small quantity to have been vaporized heretofore without use of the cold content therein, comprising vaporizing said liquefied gas in indirect heat exchange with a gaseous medium being a process gas or fuel gas, and using the resultant cooled gaseous medium for industrial or domestic purposes in either the gaseous or liquid form, wherein the gaseous medium contains components having different volatilities and at least one of the components is condensible during the heat exchange step, further comprising condensing said condensible component in at least a first heat exchange stage of said indirect heat exchange stage, separating resultant condensed component from the remaining gaseous medium, and subjecting said condensed component to direct heat exchange with a stream of combustion products of the gaseous medium, or a partial stream of the gaseous medium or of resultant vaporized liquefied gas, to revaporize said condensed component to form an admixture therewith.

2. A process according to claim 1, wherein the gaseous medium is a gas to be liquified.

3. A process according to claim 2, wherein the gaseous medium is natural gas.

4. A process according to claim 1, wherein the gaseous medium is a gas to be purified.

5. A process according to claim 4, wherein the gaseous medium is technical purity hydrogen and the hydrogen is cooled to condense out moisture, and separating the resultant hydrogen from the condensed moisture.

6. A process according to claim 5 wherein the hydrogen is cooled from a dewpoint of about $-35°$ C. to about $-70°$ C.

7. A process according to claim 1, wherein the liquefied gas is vaporized at a rate of not more than 1000 $Nm^3$ per hour.

8. A process according to claim 7, wherein the liquefied gas is oxygen, nitrogen or argon.

9. A process according to claim 1, wherein the liquefied gas is vaporized at a rate of not more than 500 $Nm^3$ per hour.

10. A process according to claim 9, wherein the liquefied gas is nitrogen or argon.

11. Apparatus for conducting a process for the vaporization of liquefied gases having a normal boiling point below 100° K., in a sufficiently small quantity to have been vaporized heretofore without use of the cold content therein, comprising vaporizing said liquefied gas in indirect heat exchange with a gaseous medium being a process gas or fuel gas, and using the resultant cooled gaseous medium for industrial or domestic purposes in either the gaseous or liquid form, said apparatus comprising indirect heat exchanger means for the indirect heat exchange between the liquid gas to be vaporized and the gaseous medium, the improvement wherein at least a part of the indirect heat exchanger is provided in at least dual design, wherein the dual-designed heat exchangers are connected in parallel with each other by valve-equipped conduits, and are respectively in communication with a condensate separator.

12. Apparatus according to claim 11, wherein the condensate separator is arranged within a flow cross section of the heat exchangers.

13. Apparatus according to claim 11, wherein the flow cross section of the heat exchangers equipped with the condensate separator is connected, via valve-equipped conduits, with a conduit for the gaseous medium to be cooled and to be withdrawn for further usage, and with a conduit carrying a purge gas.

14. In a process for the vaporization of a liquefied gas at rate of not more than 1000 $m^3$/hour, the resultant vaporized gas being either dispensed into storage bottles or used as a gas without storage, said liquefied gas being either nitrogen, argon or oxygen, comprising vaporizing said liquefied gas in indirect heat exchange with technical purity hydrogen to lower the dewpoint thereof from about $-35°$ C. to about $-70°$ C., thereby condensing out moisture from said hydrogen, and separating the resultant purified gaseous hydrogen from the condensed moisture.

15. A process according to claim 14, further comprising utilizing said purified gaseous hydrogen as a shielding gas in the heat treatment of high alloy steels.

16. A process according to claim 15, wherein the liquefied gas is vaporized at a rate of not more than 500 $Nm^3$ per hour.

17. A process according to claim 14, wherein the liquefied gas is vaporized at a rate of not more than 500 $Nm^3$ per hour.

18. A process according to claim 14, wherein the liquefied gas is oxygen.

19. A process according to claim 14, wherein the liquefied gas is nitrogen.

20. A process according to claim 14, wherein the liquefied gas is argon.

* * * * *